(12) United States Patent
Harmon et al.

(10) Patent No.: US 11,390,219 B2
(45) Date of Patent: Jul. 19, 2022

(54) MULTIFUNCTIONAL VEHICLE SEATING ASSEMBLY

(71) Applicant: Ford Global Technologies, LLC, Dearborn, MI (US)

(72) Inventors: Michael John Harmon, Westland, MI (US); Louisa Natascha Heinrich, Ann Arbor, MI (US); Jinghua Li, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 16/826,442

(22) Filed: Mar. 23, 2020

(65) Prior Publication Data

US 2021/0291744 A1   Sep. 23, 2021

(51) Int. Cl.
| | | |
|---|---|---|
| *B60R 7/02* | (2006.01) | |
| *B60N 2/06* | (2006.01) | |
| *B60N 2/32* | (2006.01) | |
| *B60N 2/34* | (2006.01) | |
| *B60R 11/00* | (2006.01) | |

(52) U.S. Cl.
CPC .................. *B60R 7/02* (2013.01); *B60N 2/06* (2013.01); *B60N 2/32* (2013.01); *B60N 2/34* (2013.01); *B60R 11/00* (2013.01); *B60R 2011/0015* (2013.01)

(58) Field of Classification Search
CPC ... B60R 7/02; B60R 11/00; B60R 2011/0015; B60N 2/06; B60N 2/32; B60N 2/34
USPC ..................................................... 297/183.6
See application file for complete search history.

(56) References Cited

U.S. PATENT DOCUMENTS

| | | | |
|---|---|---|---|
| 5,611,589 A | 3/1997 | Fuji et al. | |
| 5,951,084 A | 9/1999 | Okazaki et al. | |
| 6,264,261 B1 | 7/2001 | Krafcik | |
| 6,386,612 B2* | 5/2002 | Hofmann | B60R 7/043 |
| | | | 224/275 |
| 6,869,121 B2 | 3/2005 | Kayumi et al. | |
| 7,523,985 B2* | 4/2009 | Bhatia | B60N 2/5628 |
| | | | 297/188.1 |
| 7,883,146 B2 | 2/2011 | Saberan et al. | |
| 10,583,787 B1* | 3/2020 | Toledo | B60R 11/00 |
| 10,625,680 B1* | 4/2020 | Koehler | B60R 11/00 |
| 2004/0155494 A1* | 8/2004 | Mizuno | B60N 2/305 |
| | | | 297/188.09 |
| 2015/0001898 A1 | 1/2015 | Line et al. | |

FOREIGN PATENT DOCUMENTS

WO    2016047862 A1    3/2016

* cited by examiner

*Primary Examiner* — Mark R Wendell
(74) *Attorney, Agent, or Firm* — Vichit Chea; Price Heneveld LLP

(57) ABSTRACT

A multifunctional seating assembly for a vehicle is disclosed herein. The seating assembly includes a base slidably coupled to the vehicle. A storage compartment is defined by the base. A seat is pivotably coupled to the base and is operable to pivot about a first pivot axis that is proximate to a seating assembly-forward end of the seat from a first seat position to a second seat position. A seatback is pivotably coupled to the seat and is operable to pivot about a second pivot axis that is proximate to a seating assembly-rearward end of the seat from a first seatback position to a second seatback position. Movement of the seat from the first seat position to the second seat position provides access to the storage compartment defined by the base.

18 Claims, 7 Drawing Sheets

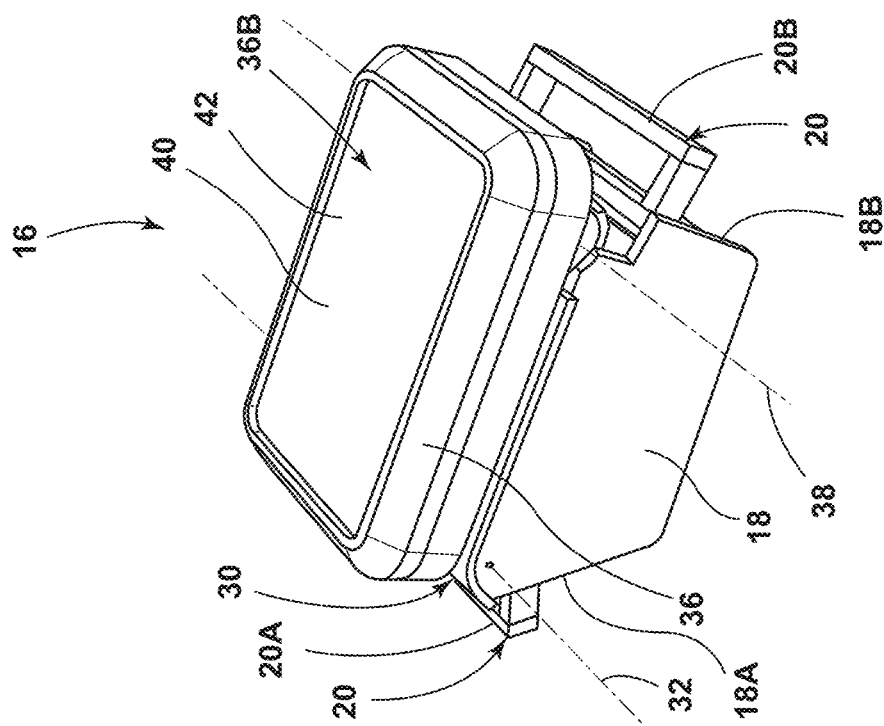
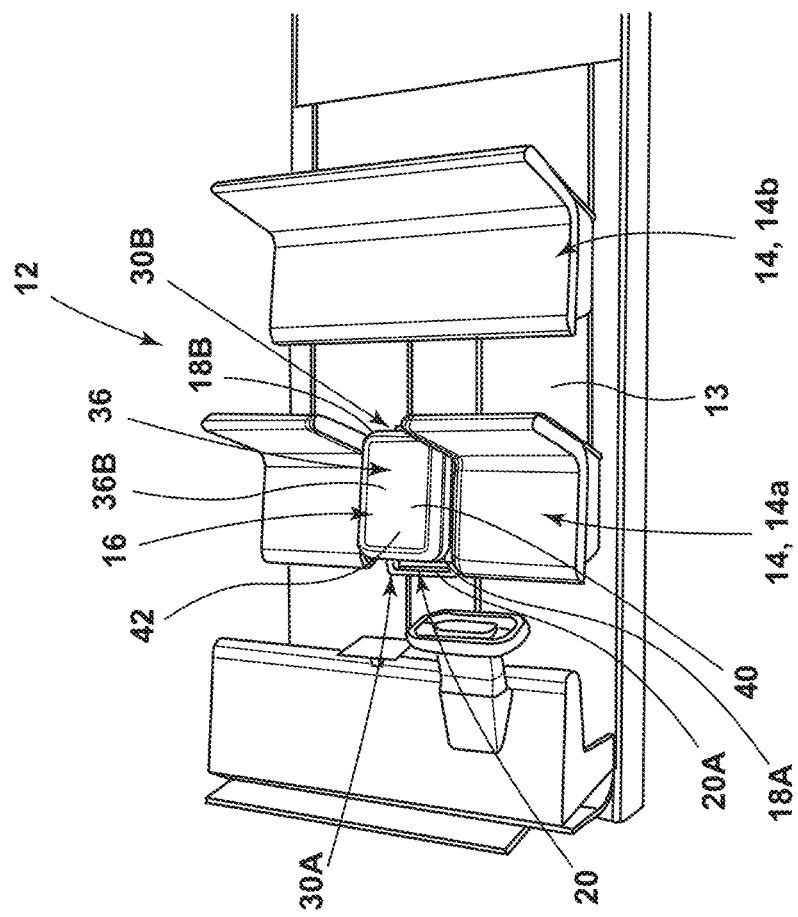
FIG. 2B
FIG. 2A

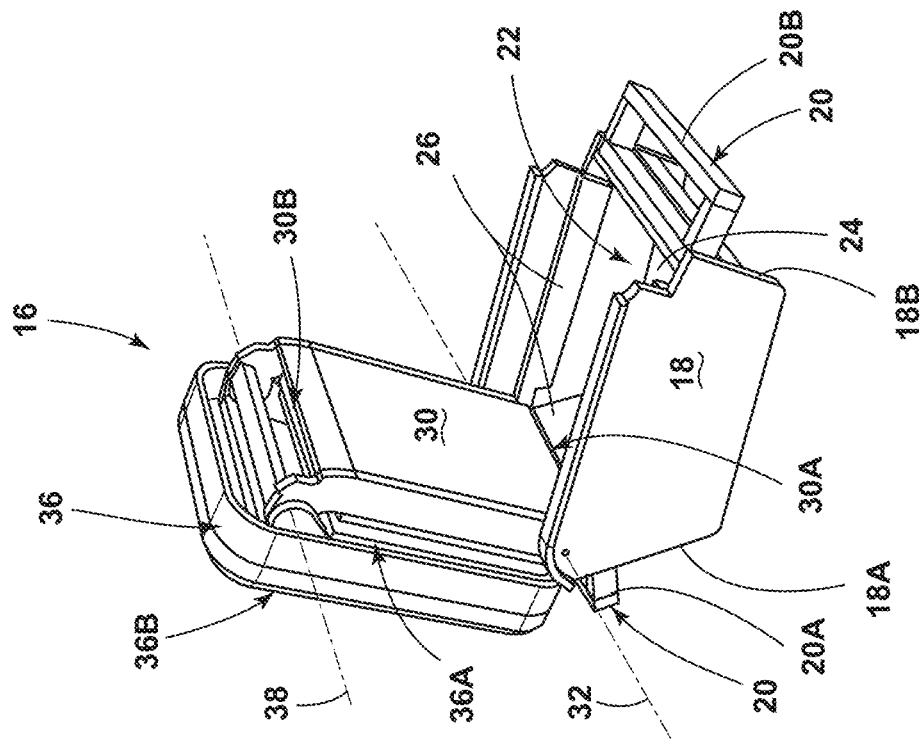
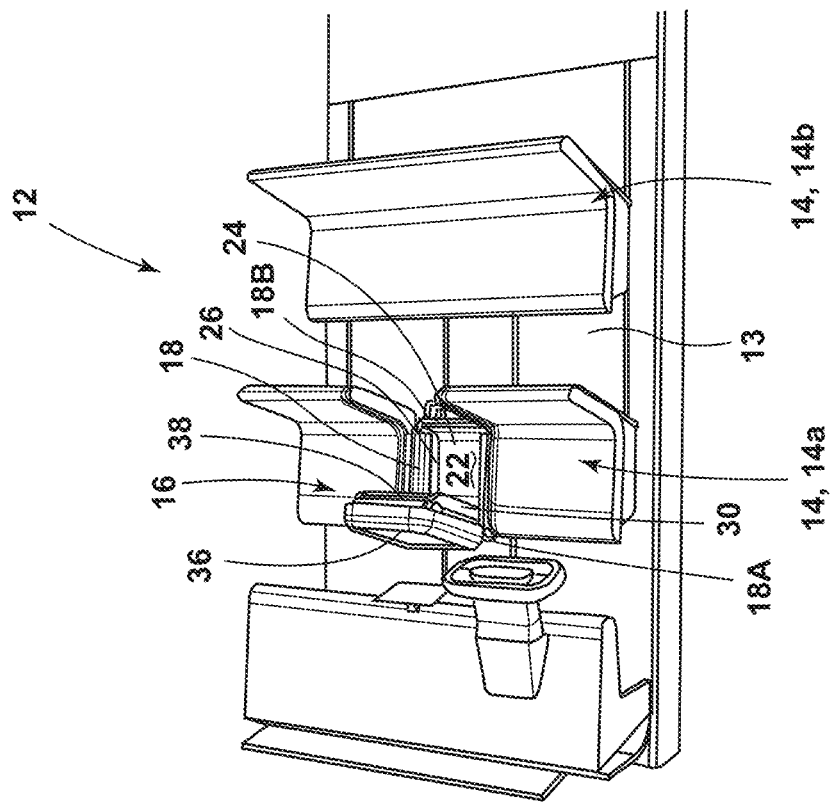
FIG. 3B
FIG. 3A

MULTIFUNCTIONAL VEHICLE SEATING ASSEMBLY

FIELD OF THE DISCLOSURE

The present disclosure generally relates to a vehicle seating assembly. More specifically, the present disclosure relates to a multifunctional vehicle seating assembly.

BACKGROUND OF THE DISCLOSURE

Vehicles often include seating assemblies that are primarily configured to provide seating for a vehicle occupant. Multifunctional vehicle seating assemblies that may be utilized as a seat, console, storage compartment, and electrical connectivity feature may be desired.

SUMMARY OF THE DISCLOSURE

According to a first aspect of the present disclosure, a seating assembly for a vehicle includes a base slidably coupled to the vehicle. A storage compartment is defined by the base. A seat is pivotably coupled to the base and is operable to pivot about a first pivot axis that is proximate to a seating assembly-forward end of the seat from a first seat position to a second seat position. A seatback is pivotably coupled to the seat and is operable to pivot about a second pivot axis that is proximate to a seating assembly-rearward end of the seat from a first seatback position to a second seatback position. Movement of the seat from the first seat position to the second seat position provides access to the storage compartment defined by the base.

Embodiments of the first aspect of the present disclosure may include one or a combination of the following features:

- the seatback generally moves with the seat as the seat moves between the first and second seat positions;
- the seatback includes a front side and a rear side, the front side generally faces a seating assembly-forward direction when the seat is in the first seat position and the seatback is in the second seatback position;
- the rear side of the seatback includes an electrical connectivity feature configured to be electrically coupled with a portable electronic device in contact with the electrical connectivity feature;
- the portable electronic device is configured to receive a wireless power transfer from the electrical connectivity feature of the rear side of the seatback while in contact with the electrical connectivity feature;
- contact between the electrical connectivity feature and the portable electronic device connects the portable electronic device with an information communication system of the vehicle; and
- a first handle is coupled to a seating assembly-forward portion of the base and a second handle is coupled to the seating assembly-rearward portion of the base.

According to a second aspect of the present disclosure, a seating assembly for a vehicle includes a base. A storage compartment is defined by the base. A seat is pivotably coupled to the base and operable to pivot between first and second seat positions. A seatback is pivotably coupled to the seat and operable to pivot between first and second seatback positions. Movement of the seat from the first seat position to the second seat position provides access to the storage compartment defined by the base.

Embodiments of the second aspect of the present disclosure may include one or a combination of the following features:

- a direction of pivoting movement of the seat as the seat pivots from the first seat position to the second seat position is generally opposite of a direction of pivoting of the seatback as the seatback pivots from the first seatback position to the second seatback position;
- the base is slidably coupled to the vehicle;
- the seat is operable to pivot about a first pivot axis that is proximate to a seating assembly-forward end of the seat from the first seat position to the second seat position;
- the seatback is operable to pivot about a second pivot axis that is proximate to a seating assembly-rearward end of the seat from the first seatback position to the second seatback position;
- the seatback generally moves with the seat as the seat moves between the first and second seat positions;
- the seatback includes a front side and a rear side, the front side generally faces a seating assembly-forward direction when the seat is in the first seat position and the seatback is in the second seatback position;
- the rear side of the seatback includes an electrical connectivity feature configured to be electrically coupled with a portable electronic device in contact with the electrical connectivity feature;
- the electrical connectivity feature is configured for wireless power transfer to the portable electronic device via contact between the rear side of the seatback and the portable electronic device;
- contact between the electrical connectivity feature and the portable electronic device connects the portable electronic device with an information communication system of the vehicle;
- a first handle is coupled to a seating assembly-forward portion of the base and a second handle is coupled to the seating assembly-rearward portion of the base; and
- a bottom of the storage compartment is disposed vehicle-upward of a floor of the vehicle.

According to a third aspect of the present disclosure, a seating assembly for a vehicle includes a base slidably coupled to the vehicle. A storage compartment is defined by the base. A seat is pivotably coupled to the base and operable to pivot about a first pivot axis that is proximate to a seating assembly-forward end of the seat from a first seat position to a second seat position. A seatback is pivotably coupled to the seat and operable to pivot about a second pivot axis that is proximate to a seating assembly-rearward end of the seat from a first seatback position to a second seatback position. Movement of the seat from the first seat position to the second seat position provides access to the storage compartment defined by the base. An electrical connectivity feature is coupled to a rear side of the seatback and configured to be wirelessly electrically coupled with a portable electronic device in contact with the rear side of the seatback.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 2A is a perspective view of the vehicle interior, illustrating the multifunctional seating assembly positioned generally in line with a first row of seating within the vehicle interior, according to one embodiment;

FIG. 2B is a perspective view of the multifunctional seating assembly, illustrating a seat in a first seat position and a seat back in a first seatback position, according to one embodiment;

FIG. 3A is a perspective view of the vehicle interior, illustrating the multifunctional seating assembly positioned generally in line with the first row of seating, and configured such that the seat is in a second seat position and the seatback is in the first seatback position, according to one embodiment;

FIG. 3B is a perspective view of the multifunctional seating assembly, illustrating the seat back in the first seatback position and the seat in the second seat position, such that a storage compartment defined by a base of the multifunctional seating assembly is exposed, according to one embodiment;

DETAILED DESCRIPTION OF THE PREFERRED EMBODIMENTS

Figure 1:
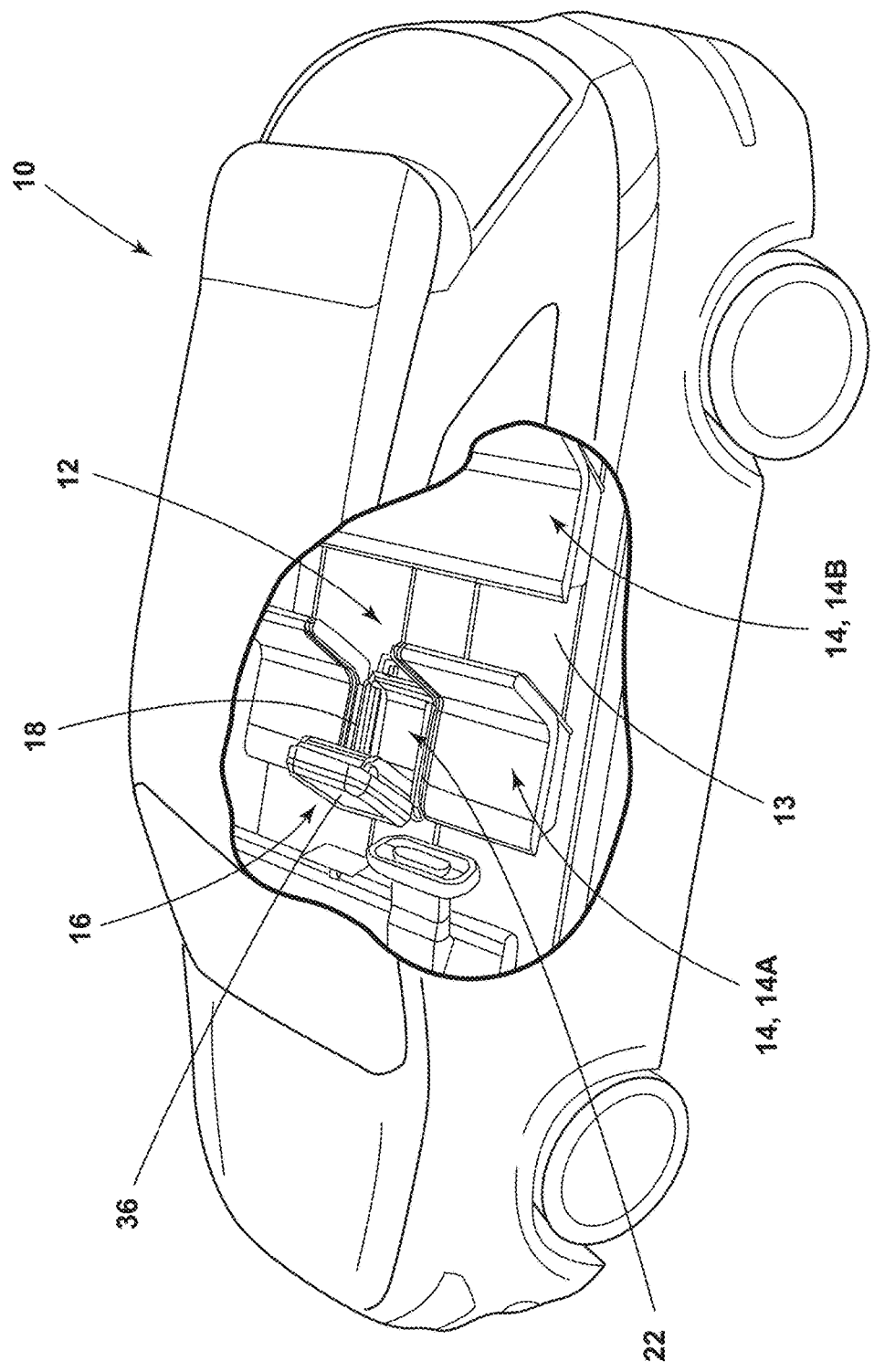
FIG. 1 is a perspective view of a vehicle, illustrating a multifunctional seating assembly disposed within a vehicle interior of the vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7, the vehicle 10 includes a multifunctional seating assembly 16. The seating assembly 16 includes a base 18 that is slidably coupled to the vehicle 10. The storage compartment 22 is defined by the base 18. A seat 30 is pivotably coupled to the base 18 and is operable to pivot about a first pivot axis 32 that is proximate to a seating assembly-forward end 30A of the seat 30 from a first seat position to a second seat position. A seatback 36 is pivotably coupled to the seat 30 and is operable to pivot about a second pivot axis 38 that is proximate to a seating assembly-rearward end 30B of the seat 30 from a first seatback position to a second seatback position. Movement of the seat 30 from the first seat position to the second seat position provides access to the storage compartment 22 defined by the base 18. An electrical connectivity feature 40 is coupled to a rear side 36B of the seatback 36 and is configured to be wirelessly electrically coupled with a portable electronic device 44 in contact with the rear side 36B of the seatback 36.

Referring now to FIGS. 1 and 2A, the vehicle 10 includes a vehicle interior 12. The vehicle interior 12 includes a floor 13. Rows of seating 14 may be coupled to the floor 13 of the vehicle 10. For example, as shown in FIGS. 1 and 2A, the vehicle interior 12 may include a first row of seating 14A and a second row of seating 14B that is vehicle-rearward of the first row of seating 14A. It is contemplated that the vehicle interior 12 may include fewer or more rows of seating 14, in various embodiments. It is further contemplated that the vehicle 10 may include various types of seating (e.g., captain's chairs, bucket seats, bench seating, etc.).

Figure 4B:
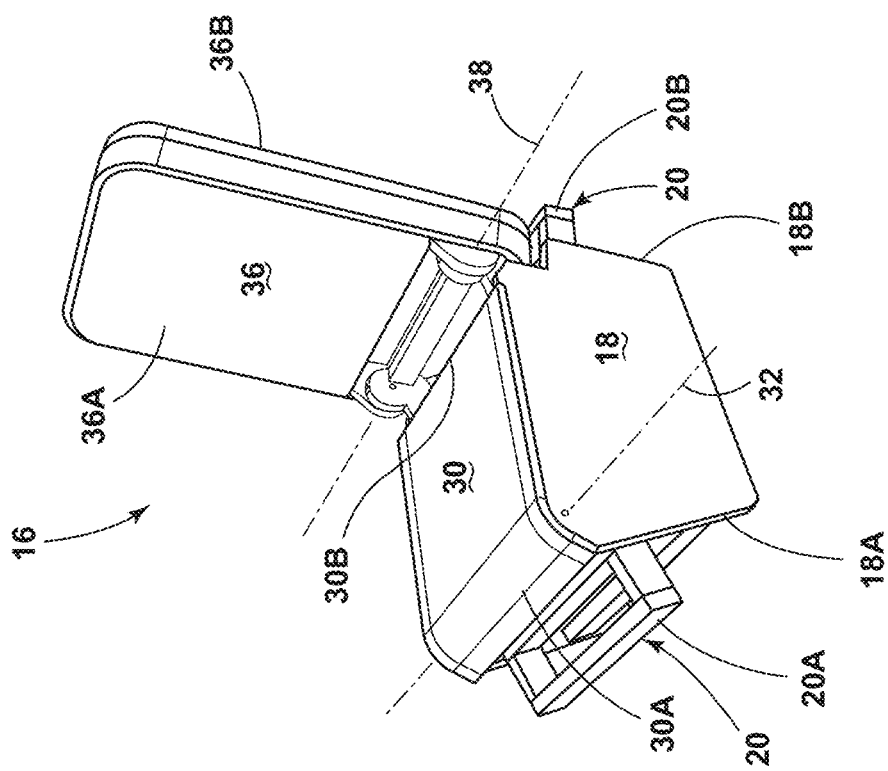
FIG. 4B is a perspective view of the multifunctional seating assembly, illustrating the seat in the first seat position and the seatback in the second seatback position, according to one embodiment.
Figure 4A:
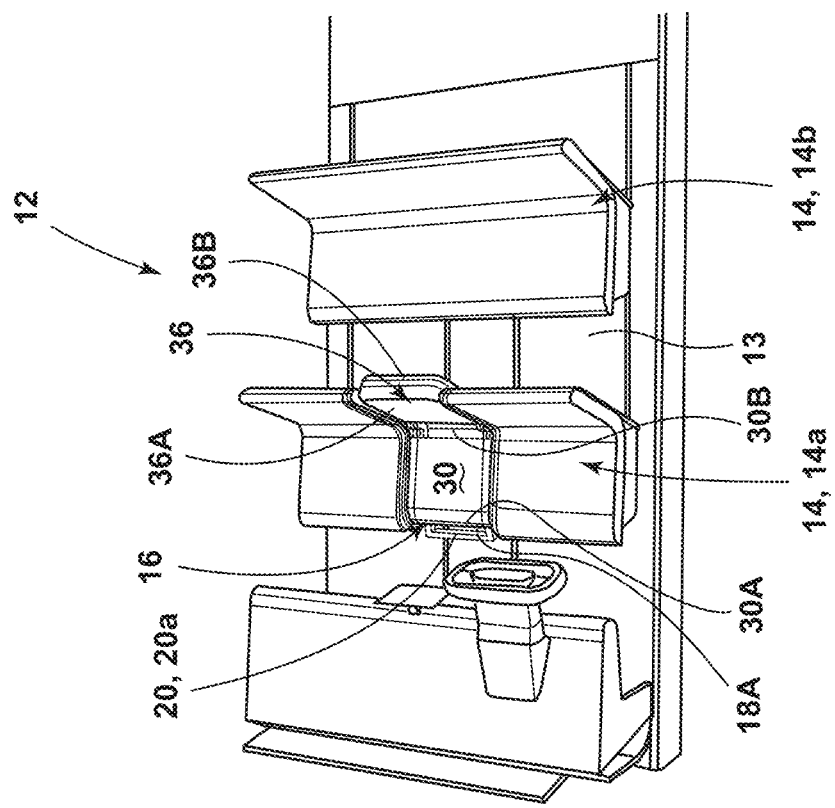
FIG. 4A is a perspective view of a vehicle interior, illustrating the multifunctional seating assembly positioned generally in line with the first row of seating, and configured such that the seat is in the first seat position and the seatback is in a second seatback position, according to one embodiment.
Figure 5:
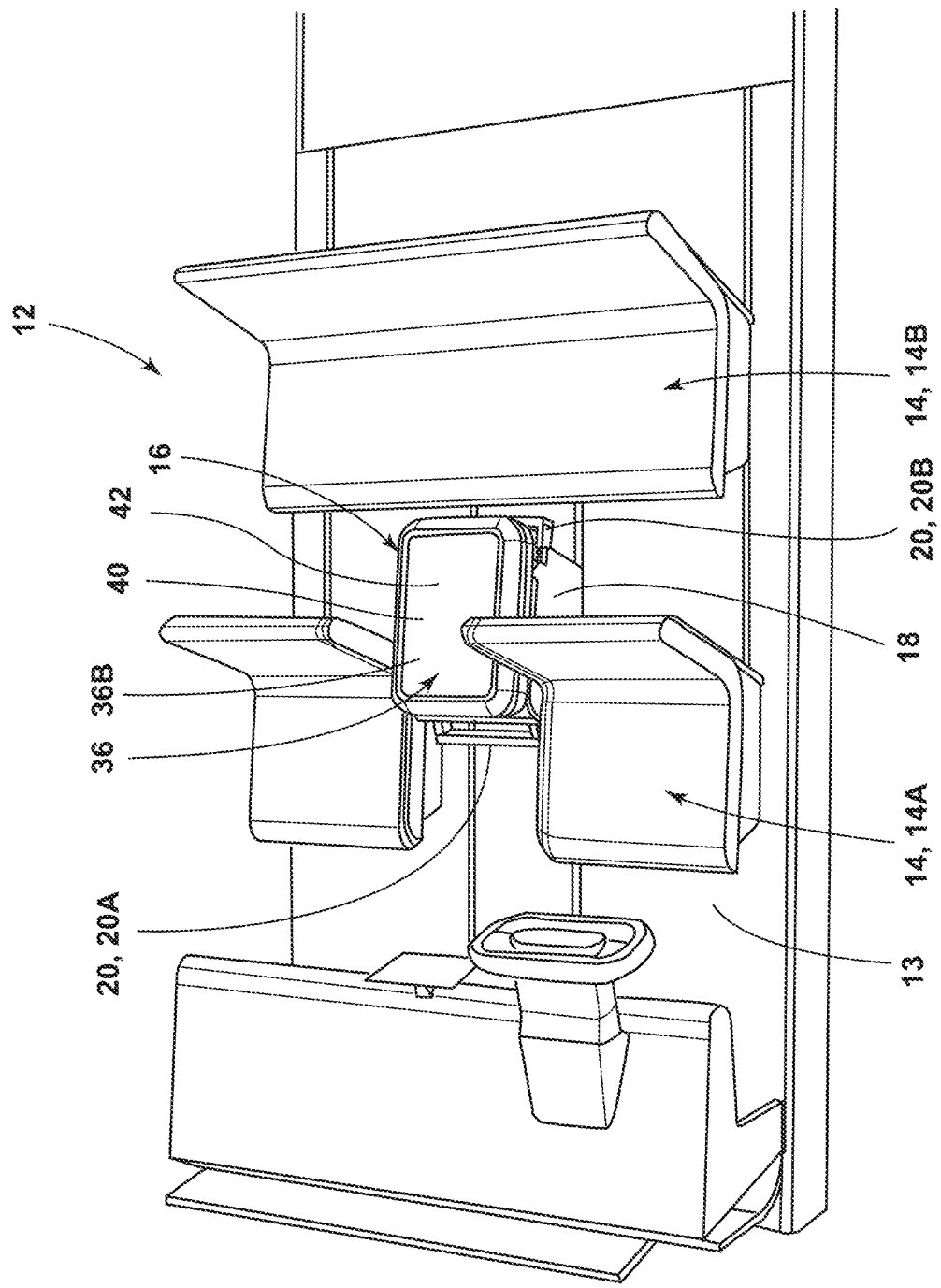
FIG. 5 is a perspective view of the vehicle interior, illustrating the multifunctional seating assembly positioned generally between the first row of seating and the second row of seating within the vehicle, according to one embodiment.
Figure 6:
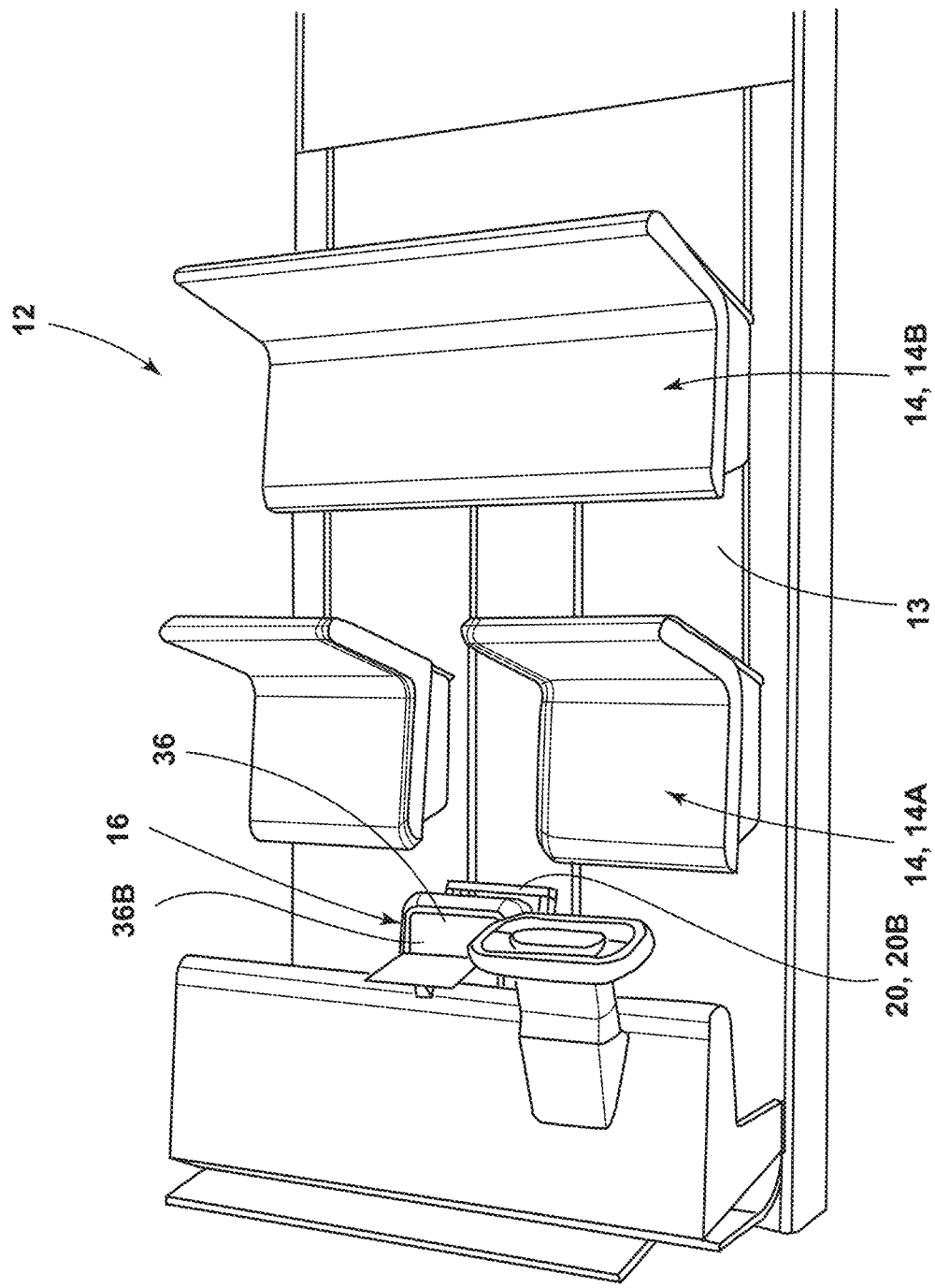
FIG. 6 is a perspective view of the vehicle interior, illustrating the multifunctional seating assembly in a position generally vehicle-forward of the first seating assembly, according to one embodiment.

Referring now to FIGS. 1-6, the vehicle 10 may include the multifunctional seating assembly 16. The multifunctional seating assembly 16 may include the base 18. The base 18 may be coupled to the vehicle 10. In various embodiments, the base 18 is coupled to the floor 13 of the vehicle 10. In some embodiments, the base 18 may be slidably coupled to the vehicle 10 and configured to slide between various positions within the vehicle interior 12. As shown in FIGS. 2A, 5, and 6, the entire seating assembly 16 may move within the vehicle interior 12 via movement of the base 18. It is contemplated that one or more of a variety of features may be utilized in allowing the base 18 to slide within the vehicle 10. For example, in some embodiments, one or more portions of the base 18 may correspond with guide tracks coupled to the floor 13 of the vehicle 10, such that the base 18 may slide within the vehicle 10 by moving within the guide tracks.

In various embodiments, the base 18 may be configured to slide within the vehicle 10 in the vehicle-forward and vehicle-rearward directions. As illustrated in FIGS. 2A, 5, and 6, the seating assembly 16 may be operable to move vehicle-forward and/or vehicle-rearward of the rows of seating 14 within the vehicle 10. For example, as shown in FIG. 6, the seating assembly 16 may be operable to slide vehicle-forward of the first row of seating 14A within the vehicle 10. As shown in FIG. 5, in some examples, the seating assembly 16 may be operable to slide generally vehicle-rearward of the first row of seating 14A in the vehicle. Further, as shown in FIG. 2A, the seating assembly 16 may be operable to slide such that the seating assembly 16 is generally aligned with the first row of seating 14A within the vehicle 10. As illustrated in FIG. 2A, the seating assembly 16 may be disposed between bucket seats that form the first row of seating 14A in the vehicle 10. It is contemplated that, in some embodiments, the base 18 (and, therefore, the seating assembly 16) may be operable to slide forward, rearward, and/or into alignment with multiple rows of seating 14 within the vehicle 10.

Referring now to FIGS. 2B, 3B, 4B, and 5, in various embodiments, the seating assembly 16 may include one or more handles 20. In some embodiments, the one or more handles 20 may be coupled to the base 18. As shown in FIG. 2A, a first handle 20A may be coupled to a seating assembly-forward portion 18A of the base 18, and a second handle 20B may be coupled to a seating assembly-rearward portion 18B of the base 18. It is contemplated that the one or more handles 20 coupled to the seating assembly 16 may aid vehicle occupants positioned both vehicle-rearward and vehicle-forward of the seating assembly 16 to move the seating assembly 16 within the vehicle interior 12.

Referring now to FIGS. 3A and 3B, the seating assembly 16 may include the storage compartment 22. In various embodiments, the base 18 may include the storage compartment 22. The storage compartment 22 may be defined by the base 18. For example, as shown in FIGS. 3A and 3B, the storage compartment 22 may be defined by interior surfaces of the base 18 that serve as a bottom 24 and a plurality of sidewalls 26 of the storage compartment 22. In various embodiments, the bottom 24 of the storage compartment 22 may be disposed vehicle-upward of the floor 13 of the vehicle 10. As such, the storage compartment 22 may move with the base 18 as the base 18 slides within the vehicle 10. It is contemplated that, in some embodiments, the base 18 may be an assembly of a plurality of components, some of which define the storage compartment 22, and some of which do not. For example, in some embodiments, the base 18 may include a bin disposed within the base 18, such that the storage compartment 22 is defined by the base 18 via the bin.

Referring now to FIGS. 2A-4B, the seating assembly 16 may include the seat 30. The seat 30 may include the seating assembly-forward end 30A and the seating assembly-rearward end 30B. In various embodiments, the seat 30 may be pivotably coupled to the base 18. The seat 30 may be operable to pivot between a first seat position, illustrated in FIGS. 2A, 2B, 4A, and 4B, and a second seat position, illustrated in FIGS. 3A and 3B. As illustrated, in various embodiments, the seat 30 may be operable to generally cover the storage compartment 22 defined by the base 18 of the seating assembly 16 when in the first seat position. As illustrated in FIGS. 3A and 3B, the storage compartment 22 may be generally exposed when the seat 30 is in the second seat position. In various embodiments, movement of the seat 30 from the first seat position to the second seat position may provide access to the storage compartment 22 defined by the base 18. It is contemplated that, in some embodiments, access to the storage compartment 22 may be provided in a plurality of ways. For example, in some embodiments, a door may be disposed on a side of the base 18 and may provide access to the storage compartment 22 in addition to the access that is provided via movement of the seat 30 from the first seat position to the second seat position.

In various embodiments, the seat 30 may pivot between the first and second seat positions about the first pivot axis 32. As shown in FIGS. 2B, 3B, and 4B, the first pivot axis 32 may be proximate to the seating assembly-forward end 30A of the seat 30. In such embodiments, the seat 30 may pivot seating assembly 16 forward from the first seat position to the second seat position. Seating assembly-forward movement may correspond with the vehicle-forward movement, in some embodiments. For example, in the embodiment illustrated in FIGS. 2A-3B, the seat 30 is configured to pivot vehicle-forward from the first seat position, shown in FIG. 2A, to the second seat position, shown in FIG. 3A. It is contemplated that the seating assembly-forward direction may correspond with a variety of vehicle-directions based on the orientation of the seating assembly 16 within the vehicle 10. For example, if the seating assembly 16 is oriented to face vehicle-rearward, the seating assembly-forward direction may correspond with the vehicle-rearward direction.

Referring further to FIGS. 2A-4B, the seating assembly 16 may include the seatback 36. The seatback 36 may include a front side 36A and the rear side 36B and may be pivotably coupled to the seat 30. The seatback 36 may be operable to pivot between a first seatback position, illustrated in FIGS. 2A-3B, and a second seatback position, illustrated in FIGS. 4A and 4B. In various embodiments, the seatback 36 may pivot between the first and second seatback positions about the second pivot axis 38. As shown in FIGS. 2B, 3B, and 4B, in some embodiments, the second pivot axis 38 may be proximate to the seating assembly-rearward end 30B of the seat 30. In such embodiments, the seatback 36 may pivot the seating assembly-rearward from the first seatback position to the second seatback position, as shown in FIG. 4A.

Referring still to FIGS. 2A-4B, in various embodiments, the seating assembly 16 may be configured to serve a variety of different functions for vehicle occupants based on how the various components of the seating assembly 16 are positioned. For example, the seating assembly 16 may be configured to receive a sitting occupant when the seat 30 is in the first seat position and the seatback 36 is in the second seatback position, as shown in FIGS. 4A and 4B. When the seat 30 and the seatback 36 are positioned in this way, the front side 36A of the seatback 36 may generally face the seating assembly-forward direction. In another configuration of the seating assembly 16, the seating assembly 16 may be configured to serve as a vehicle console when the seat 30 is in the first seat position and the seatback 36 is in the first seatback position, as illustrated in FIGS. 2A and 2B. When the seat 30 and the seatback 36 are positioned in this way, the rear side 36B of the seatback 36 may generally face the vehicle-upward direction, and the front side 36A of the seatback 36 may generally face the vehicle-downward direction. As illustrated in FIGS. 3A and 3B and described above, the seat 30 may be moved from the first seat position to the second seat position to provide access to the storage compartment 22 defined by the base 18. As such, the seat 30 (or the seat 30 and seatback 36 in combination, as shown in FIGS. 3A and 3B) may operate as a door to the storage compartment 22. As illustrated in FIGS. 3A and 3B, the seatback 36 may generally move with the seat 30 as the seat 30 moves between the first and second seat positions.

In various embodiments, the first pivot axis 32 and the second pivot axis 38 may be disposed proximate to opposite ends of the seat 30, as illustrated in FIGS. 2B, 3B, and 4B. In various embodiments, the first pivot axis 32 and a second pivot axis 38 may be generally, substantially, and/or entirely parallel to one another. In various embodiments, the direction of pivoting movement of the seat 30 as the seat 30 pivots from the first seat position to the second seat position may be generally opposite of a direction of pivoting of the seatback 36 as the seatback 36 pivots from the first seatback position to the second seatback position.

Figure 7:
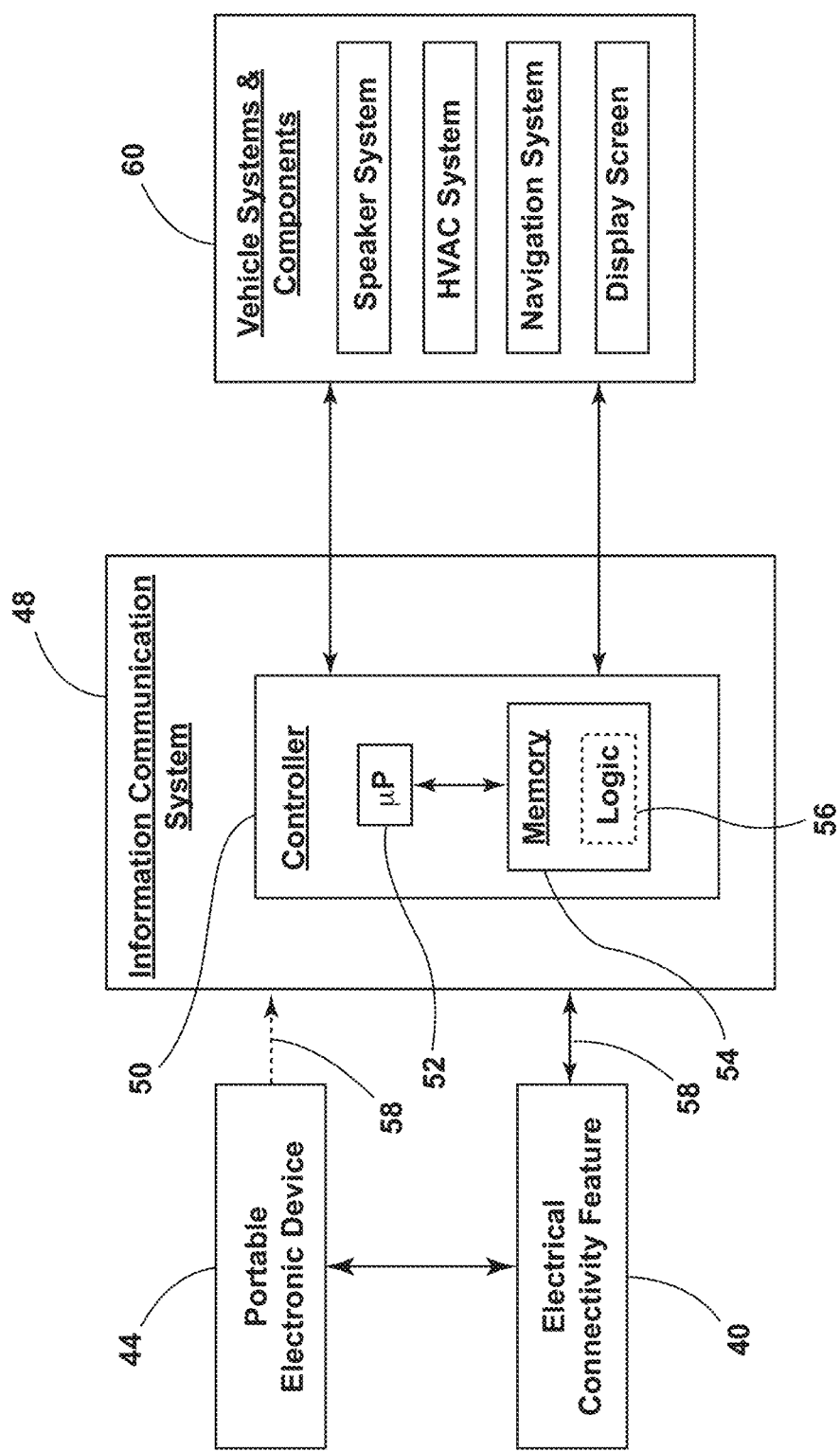
FIG. 7 is a block diagram of an information communication system of the vehicle, according to one embodiment.

Referring now to FIGS. 2B and 7, various embodiments, the rear side 36B of the seatback 36 may include the electrical connectivity feature 40. The electrical connectivity feature 40 may be integrated with the rear side 36B of the seatback 36, such that the electrical connectivity feature 40 may be configured to be electrically coupled with a compatible portable electronic device 44 (e.g., cellular phone, smart watch, tablet, etc.) that is in contact with the exterior surface 42 of at least a portion of the rear side 36B of the seatback 36. In some embodiments, the electrical connectivity feature 40 may be configured to be wirelessly electrically coupled with the portable electronic device 44 that is in contact with the rear side 36B of the seatback 36. In some examples, the electrical connectivity feature 40 may be configured for wireless power transfer to the portable electronic device 44 via the wireless electrical coupling between the electrical connectivity feature 40 and the portable electronic device 44 in contact with the rear side 36B of the seatback 36. It is contemplated that the electrical connectivity feature 40 may utilize one or more of a variety of types of wireless charging methods to accomplish the wireless power transfer to the portable electronic device 44, in various embodiments (e.g., inductive coupling, resonant inductive coupling, capacitive coupling, etc.).

In some examples, the electrical connectivity feature 40 may additionally, or alternatively, be configured to connect the portable electronic device 44 with an information communication system 48 of the vehicle 10 via the wireless electrical coupling between the portable electronic device 44 and the electrical connectivity feature 40, such that data may be transmitted between the portable electronic device 44 and the information communication system 48. As shown in FIG. 7, in various embodiments, the information communication system 48 may include and/or be coupled with a controller 50 configured to receive various inputs 58 and control various outputs. The controller 50 may include a microprocessor 52 and memory 54, as illustrated, according to various embodiments. It should be appreciated that the controller 50 may include control circuitry such as analog and/or digital control circuitry. Stored within the memory 54 and executed by the microprocessors 52 logic 56 for processing the various inputs 58 and controlling various outputs described herein. The controller 50 may be configured to control the function of various vehicle systems and/or components 60 by issuing outputs to those systems in response to received inputs 58. For example, the controller 50 may be configured to control a heating, ventilation, and air conditioning (HVAC) system of the vehicle 10, a speaker system of the vehicle 10, a navigational system of the vehicle 10, one or more vehicle display screens, and/or various other vehicle systems and/or components, based on inputs 58 received by the controller 50.

In some embodiments, the controller 50 may be configured to control the function of various vehicle systems and/or components 60 in response to receiving inputs 58 from the portable electronic device 44 connected to the information communication system 48 via the electrical connectivity feature 40. For example, a user of the portable electronic device 44 may enter inputs 58 into the portable electronic device 44 while the portable electronic device 44 is connected to the information communication system 48 via the electrical coupling to the electrical connectivity feature 40. The inputs 58 may be transmitted to the controller 50, which may then control outputs to control the functions of one or more vehicle systems and/or components 60 based on the received inputs 58.

In a non-limiting example, a cellular phone may be placed on the exterior surface 42 of the rear side 36B of the seatback 36, such that the cellular phone becomes electrically coupled to the electrical connectivity feature 40. The electrical coupling connects the cellular phone into the information communication system 48. The connected cellular phone may then display a user interface with input options that correspond with functions of one or more of a variety of vehicle systems and/or components 60 (e.g., speaker volume, HVAC controls, etc.). When the user selects an input option to, for example, increase the volume of the speaker system of the vehicle 10, the input 58 from the connected cellular phone is transmitted to the controller 50. The controller 50 may then issue an output based on the received input 58 to increase the volume of the speaker system of the vehicle 10.

In some embodiments, contact between the rear side 36B of the seatback 36 and the portable electronic device 44 that electrically couples the portable electronic device 44 to the electrical connectivity feature 40 may grant access to the portable electronic device 44 to connect to the information communication system 48. For example, the portable electronic device 44 being electrically coupled to the electrical connectivity feature 40 may enable the portable electronic device 44 to be connected with the information communication system 48 via a remote communication protocol (e.g., Bluetooth®, etc.). Further, it is contemplated that, in various embodiments, the portable electronic device 44 may be connected with the information communication system 48 without being electrically coupled to the electrical connectivity feature 40 via one or more of a variety of methods of remote communication.

The present disclosure may provide a variety of advantages. First, the base 18 of the seating assembly 16 being slidable within the vehicle may aid vehicle occupants in both the first row of seating 14A and the second row seating 14B within the vehicle 10 to access the seating assembly 16 to utilize one or more of the functions of the seating assembly 16. Second, having the first handle 20A coupled to the seating assembly-forward portion 18A of the base 18 and the second handle 20B coupled to the seating assembly-rearward portion 18B of the base 18 may provide a convenient handhold for vehicle occupants position both vehicle-forward and vehicle-rearward of the seating assembly 16 to grab in order to slide the seating assembly 16 within the vehicle 10. Third, the storage compartment 22 being defined by the slidable base 18 may allow vehicle occupants in various parts of the vehicle 10 to access the storage compartment 22. Fourth, the seatback 36 being operable to move to the second seatback position while the seat 30 remains in the first seat position provides a functional seating assembly 16 for a vehicle occupant to sit in. Fifth, the electrical connectivity feature 40 coupled to the rear side 36B of the seatback 36 may provide a vehicle occupant with the convenience of being able to charge portable electronic devices 44 and/or connect the portable electronic devices 44 to the information communication system 48 of the vehicle 10 in order to control various vehicle systems and/or components 60.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A seating assembly for a vehicle, comprising:
a base slidably coupled to the vehicle;
a storage compartment defined by the base;
a seat pivotably coupled to the base and operable to pivot about a first pivot axis that is proximate to a seating assembly-forward end of the seat from a first seat position to a second seat position; and
a seatback pivotably coupled to the seat and operable to pivot about a second pivot axis that is proximate to a seating assembly-rearward end of the seat from a first seatback position to a second seatback position, wherein movement of the seat from the first seat position to the second seat position provides access to the storage compartment defined by the base, and wherein the seatback generally moves with the seat as the seat moves between the first and second seat positions.
2. The seating assembly of claim 1, wherein the seatback comprises:
a front side; and
a rear side, wherein the front side generally faces a seating assembly-forward direction when the seat is in the first seat position and the seatback is in the second seatback position.
3. The seating assembly of claim 2, wherein the rear side of the seatback comprises:
an electrical connectivity feature configured to be electrically coupled with a portable electronic device in contact with the electrical connectivity feature.
4. The seating assembly of claim 3, wherein the portable electronic device is configured to receive a wireless power transfer from the electrical connectivity feature of the rear side of the seatback while in contact with the electrical connectivity feature.
5. The seating assembly of claim 3, wherein contact between the electrical connectivity feature and the portable electronic device connects the portable electronic device with an information communication system of the vehicle.
6. The seating assembly of claim 1, further comprising:
a first handle coupled to a seating assembly-forward portion of the base; and
a second handle coupled to a seating assembly-rearward portion of the base.
7. A seating assembly for a vehicle, comprising:
a base;
a storage compartment defined by the base;
a seat pivotably coupled to the base and operable to pivot between first and second seat positions; and
a seatback pivotably coupled to the seat and operable to pivot between first and second seatback positions, wherein movement of the seat from the first seat position to the second seat position provides access to the storage compartment defined by the base, and wherein the seatback generally moves with the seat as the seat moves between the first and second seat positions.
8. The seating assembly of claim 7, wherein a direction of pivoting movement of the seat as the seat pivots from the first seat position to the second seat position is generally opposite of a direction of pivoting of the seatback as the seatback pivots from the first seatback position to the second seatback position.
9. The seating assembly of claim 7, wherein the base is slidably coupled to the vehicle.
10. The seating assembly of claim 7, wherein the seat is operable to pivot about a first pivot axis that is proximate to a seating assembly-forward end of the seat from the first seat position to the second seat position.
11. The seating assembly of claim 10, wherein the seatback is operable to pivot about a second pivot axis that is proximate to a seating assembly-rearward end of the seat from the first seatback position to the second seatback position.
12. The seating assembly of claim 7, wherein the seatback comprises:
a front side; and
a rear side, wherein the front side generally faces a seating assembly-forward direction when the seat is in the first seat position and the seatback is in the second seatback position.
13. The seating assembly of claim 12, wherein the rear side of the seatback comprises:
an electrical connectivity feature configured to be electrically coupled with a portable electronic device in contact with the electrical connectivity feature.
14. The seating assembly of claim 13, wherein the electrical connectivity feature is configured for wireless power transfer to the portable electronic device via contact between the rear side of the seatback and the portable electronic device.
15. The seating assembly of claim 13, wherein contact between the electrical connectivity feature and the portable electronic device connects the portable electronic device with an information communication system of the vehicle.
16. The seating assembly of claim 7, further comprising:
a first handle coupled to a seating assembly-forward portion of the base; and
a second handle coupled to a seating assembly-rearward portion of the base.
17. The seating assembly of claim 7, wherein a bottom of the storage compartment is disposed vehicle-upward of a floor of the vehicle.
18. A seating assembly for a vehicle, comprising:
a base slidably coupled to the vehicle;
a storage compartment defined by the base;
a seat pivotably coupled to the base and operable to pivot about a first pivot axis that is proximate to a seating assembly-forward end of the seat from a first seat position to a second seat position;

a seatback pivotably coupled to the seat and operable to pivot about a second pivot axis that is proximate to a seating assembly-rearward end of the seat from a first seatback position to a second seatback position, wherein movement of the seat from the first seat position to the second seat position provides access to the storage compartment defined by the base, and wherein the seatback generally moves with the seat as the seat moves between the first and second seat positions; and an electrical connectivity feature coupled to a rear side of the seatback and configured to be wirelessly electrically coupled with a portable electronic device in contact with the rear side of the seatback.

* * * * *